United States Patent [19]

Martone

[11] Patent Number: 5,062,620
[45] Date of Patent: Nov. 5, 1991

[54] FLEXIBLE LINK AND METHOD FOR A VEHICULAR SUSPENSION SYSTEM

[75] Inventor: Christopher J. Martone, Rochester Hills, Mich.

[73] Assignee: General Motors Corporation, Detroit, Mich.

[21] Appl. No.: 569,337

[22] Filed: Aug. 20, 1990

[51] Int. Cl.⁵ .......................................... B60G 11/10
[52] U.S. Cl. .................... 267/260; 280/719; 280/720
[58] Field of Search ............ 280/699, 719, 720, 694, 280/669; 267/260

[56] References Cited

U.S. PATENT DOCUMENTS 1,397,997  11/1921  Zeppegno .................... 267/260
2,254,282  9/1941  Griswold .................... 280/719

Primary Examiner—Kenneth R. Rice
Attorney, Agent, or Firm—A. Michael Tucker

[57] ABSTRACT

A flexible link includes an elongated central portion formed from a flexible steel cable. First and second cylindrical heads are provided at the ends of the cable. The first head is inserted through an opening on a first suspension component so that the second head is adjacent the first component and retains the first component. The first head is then inserted into a complementary keyway on a second suspension component to secure the link. Tensile forces from the components are transferred and accommodated by the flexible central portion. The tensile force in the link keeps the heads in place and seated in both the first and second components.

6 Claims, 1 Drawing Sheet

FLEXIBLE LINK AND METHOD FOR A VEHICULAR SUSPENSION SYSTEM

BACKGROUND OF THE INVENTION

1. Field of the Invention

The present invention relates generally to vehicular suspension systems and, in particular, is concerned with a flexible link and method for quickly connecting and transmitting a tensile force between two components of a suspension system.

2. Statement of the Related Art

Tensile forces are well-known in automotive suspension systems. For example, leaf springs, which are mounted transversely with respect to the longitudinal axis of a vehicle, are connected at opposite ends to a knuckle provided at each wheel assembly. As a knuckle travels up and down due to road inputs, a tensile force is transmitted to the leaf spring through a conventional rigid fastener. Oftentimes, the suspension system environment undergoes dynamic and high stresses in the range of approximately 700 ft/lbs. To accommodate such strain, conventional rigid fasteners require the use of large elastomeric bushings which compensate for the relative movements of the leaf spring and the knuckle.

Other suspension system components which are connected together and incur relative movement with respect to each other require fasteners or connectors which are capable of transmitting tensile forces. For example, a torque arm hanger is mounted at one end to a tubular torsion bar and connected at the opposite end by a fastener to a control arm. As the control arm pivots due to road inputs or the torsion bar rotates, the fastener connecting the torque arm hanger to the control arm must be capable of transmitting tensile forces.

The art continues to seek improvements. It is desirable to provide a fastener or link to connect and transmit tensile forces between two components of a suspension system without the need for elastomeric bushings. An improved link should be economical to manufacture and provide quick connection between the components.

SUMMARY OF THE INVENTION

The present invention includes a flexible link for use in a vehicular suspension system. In particular, a flexible link is used to connect and transmit tensile forces between two components of a suspension system. The flexible link accommodates the relative movement between the connected elements, e.g., a leaf spring and a knuckle, which results from road inputs and eliminates the need for elastomeric bushings. The present flexible link provides a method of quick assembly which is simplified and improves serviceability.

In a preferred embodiment, a flexible link includes an elongated central portion formed from a flexible steel cable. First and second cylindrical heads are provided at the ends of the cable. The first head is inserted through an opening on a first suspension component so that the second head is adjacent the first component and retains the first component. The first head is then inserted into a complementary keyway on a second suspension component to secure the link. Tensile forces from the components are transferred and accommodated by the flexible central portion. The tensile force in the link keeps the heads in place and seated in both the first and second components.

DETAILED DESCRIPTION OF THE PREFERRED EMBODIMENT

Figure 1:
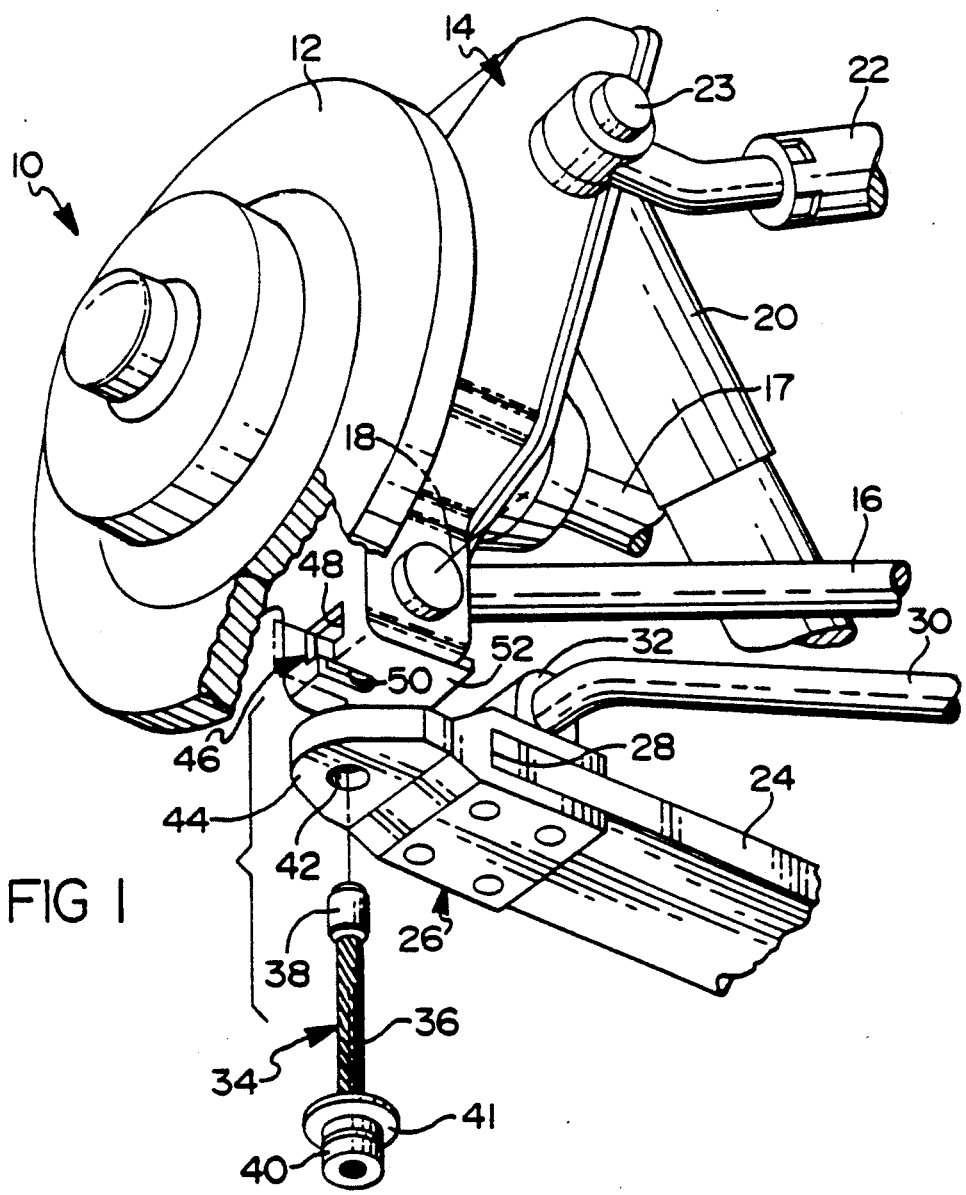
FIG. 1 is a partially exploded, perspective view of an automotive suspension system illustrating a flexible link of the present invention connecting a leaf spring to a knuckle.
Figure 2:
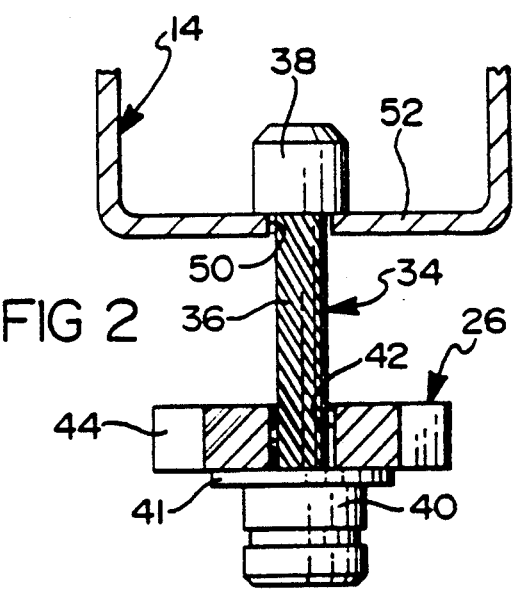
FIG. 2 is a sectional view through the leaf spring and the knuckle of FIG. 1 illustrating a mounted flexible link according to the present invention.

A conventional automotive independent rear suspension system is indicated generally at 10 and illustrated in FIG. 1. A rotor assembly 12 for mounting a wheel assembly (not illustrated) is mounted on a knuckle 14. The outbound end of a lower control arm 16 is pivotally connected to the knuckle 14 at pivot axis 18. At its inbound end, the lower control arm 16 is pivotally connected to an automotive frame (not illustrated). An axle 17 is transversely mounted with respect to a longitudinal axis of the vehicle and is connected at each end to a respective knuckle 14. A hydraulic damper 20, e.g., a shock absorber, is pivotally connected at its upper end to the knuckle 14 and pivotally mounted at its lower end to the frame. A toe link 22 is pivotally connected at its outbound end to the knuckle 14 at pivot axis 23 and is pivotally connected at its inbound end to the frame.

A leaf spring 24 is mounted transversely with respect to the longitudinal axis of the vehicle. If desired, the leaf spring 24 can be formed as a composite, flexible spring. A spring hanger 26 is press fitted onto the end of the leaf spring 24 at a receiving opening 28. A plurality of fasteners (not illustrated) are inserted through the hanger 26 and the leaf spring 24 to retain the hanger 26 onto the leaf spring 24. A stabilizer bar 30 is pivotally mounted to an upper surface of the hanger 26 at a mounting site 32.

A flexible link indicated generally at 34 is utilized to connect the leaf spring 24 to the knuckle 14. The link 34 includes an elongated central portion 36 formed preferably from a flexible steel cable. In other embodiments, the central portion 36 can be formed from any suitable material, including elastomeric materials. An upper cylindrical head 38 is mounted to a first end of the central portion 36. A lower cylindrical head 40 is mounted to the opposite end of the central portion 36. The upper and lower heads 38, 40 can be formed from stainless steel or any other suitable material. If desired, the lower head 40 can include a flange 41 which is seated against the bracket 26 as described below.

For assembly, the upper head 38 of the link 34 is passed through an opening 42 on a mounting ear 44 of the spring hanger 26 and received into a complementary keyway indicated generally at 46 provided on the knuckle 14. The keyway 46 includes an upper passageway 48 in a side surface of the knuckle 14 complementary to the outline of the upper head 38 of the link 34. A slot 50 have an outline complementary to the central portion 36 is provided in a lower surface 52 of the knuckle 14. Preferably, the passageway 48 and the slot 50 are formed as a continuous cut to produce a T-shaped slot.

When installed, a tensile force in the flexible link 34 caused by the leaf spring 24 or the knuckle 14 keeps the heads 38, 40 retained and seated against the knuckle 14 and the mounting ear 44. During vehicle operation, the link 34 operates under dynamic and high stress (approximately 700 ft/lbs) and provides the necessary flexibility via the central portion 36 as relative movement occurs between the leaf spring 24 and the knuckle 14. The link 34 moves in a first plane along the longitudinal axis of the central portion 36 and a second plane perpendicular the first plane as the knuckle 14 and leaf spring 24 move in these planes due to road inputs.

The present flexible link 34 provides an economical link and method to quickly connect a composite leaf spring 24 to the knuckle 14 of an automotive suspension system. In particular, the flexible central portion 36 enables the link 34 to respond without elastomeric bushings required by conventional rigid links.

The flexible link 34 is easily adapted to other conventional components in a suspension system. For example, the flexible link 34 can be used to connect and transmit tensile forces between a torque arm hanger (not illustrated) and a control arm. It will be apparent that other uses of the flexible link 34 in a suspension system can be envisioned to transmit tensile forces.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. An automotive suspension system comprising:
   a knuckle for receiving a wheel assembly;
   a leaf spring mounted on a vehicle;
   a spring hanger mounted onto an end of the leaf spring, the spring hanger including an opening; and
   a flexible link for connecting the leaf spring to the knuckle including
   a central flexible portion;
   a first head connected to one end of the flexible portion, the first head inserted through the spring hanger opening and removably received into a complementary lot on the knuckle, and
   a second head connected to an opposite end of the flexible portion for retaining the spring, whereby the flexible portion is received in the opening of the spring hanger.

2. The suspension system specified in claim 1 wherein the outer circumference of the second head is greater than the opening in the spring hanger.

3. The suspension system specified in claim 1 wherein the central portion of the link is formed from flexible steel cable.

4. The suspension system specified in claim 1 wherein the leaf spring is formed as a flexible composite leaf spring.

5. A method of quickly connecting two components of an automotive suspension system which undergo relative movement, the method comprising the steps of:
   (a) providing an elongated flexible link having cylindrical heads to each end, wherein a first head has a smaller circumference than a second head;
   (b) forming a complementary slot on a first component for receiving the second head of the link;
   (c) providing an opening on a second component for receiving the link;
   (d) inserting the first head of the link through the opening of the second component so that the second head is retained against the second component;
   (e) inserting the first head of the link into the complementary slot of the first component to removably connect the second component to the first component.

6. The method specified in claim 5 wherein the flexible link is formed from flexible steel cable.

* * * * *